Dec. 12, 1967   J. H. RISEMAN ETAL   3,357,909
GLASS ELECTRODES
Filed June 2, 1964
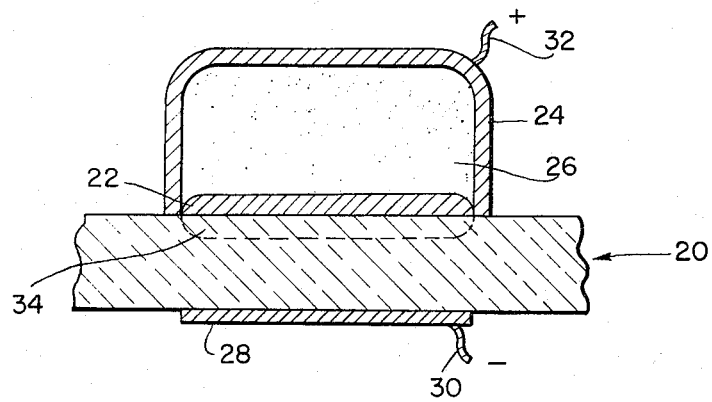
FIG. I
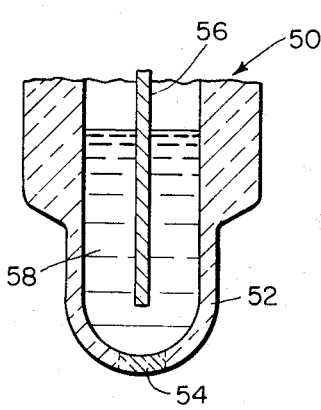
FIG. 3
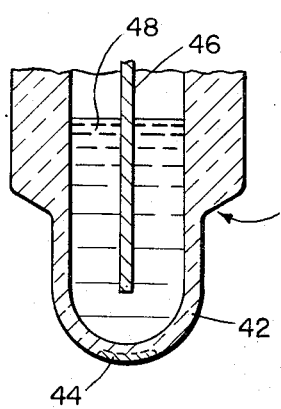
FIG. 2
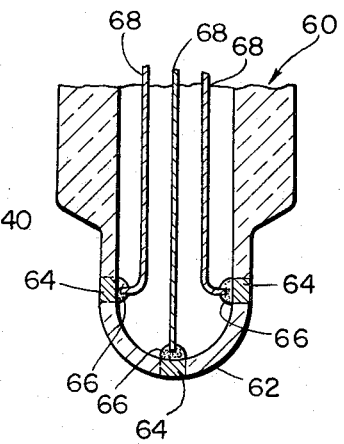
FIG. 4
INVENTORS
JOHN H. RISEMAN
JAMES W. ROSS
GEORGE EISENMAN
Robert J. Schuller
ATTORNEY

3,357,909
GLASS ELECTRODES
John H. Riseman, Cambridge, and James W. Ross, Newton, Mass., and George Eisenman, Salt Lake City, Utah, assignors to Corning Glass Works, Corning, N.Y., a corporation of New York
Filed June 2, 1964, Ser. No. 379,757
9 Claims. (Cl. 204—195)

This invention relates to ion-sensitive glass electrodes and more particularly to an electrode having a glass membrane, a predetermined portion of which has been endowed with ion-sensitive properties differing from the properties of the balance of such membrane and methods for making such electrode membranes.

A number of glass electrode structures are known which have utility in determining and measuring the presence and concentration of various ions. Such electrode structures usually incorporate as the ion-sensitive member a thin membrane of a so-called ion-sensitive glass, one surface of the membrane being adapted to contact the medium in which may be found the ions being sought. Potential across the membrane from surface to surface is a function of the concentration of such ions, and the measurement of the potential provides the desired data on concentration.

Glass membranes typically exhibit bulk resistivities in the order of $1 \times 10^{10}$ ohms cm., and thus the measurement of potential is accomplished with known apparatus capable of measuring small potentials (in the millivolt range) despite a high source impedance. The membranes are therefore kept quite thin and usually are formed as bulbous structures.

A number of different glasses can be used to form the membranes, depending upon the nature of the response desired. For example, pH responsive glass is disclosed in U.S. Patent No. 2,462,843 issued Mar. 1, 1949, to H. Carey et al.; a sodium-ion responsive glass is described in U.S. Patent No. 2,829,090 issued Apr. 1, 1958, to G. Eisenman et al.; a potassium-ion responsive glass is described in U.S. Patent No. 3,041,252 issued June 26, 1962, to G. Eisenman et al.; and many others are described in both the patent and text literature.

In all of these prior art electrodes, the membrane is substantially homogeneous in composition, and the electrode per se is, therefore, primarily responsive to but the single specie of ion, i.e., the ionic specie to which the membrane exhibits a desired selectivity. While it is clear that, for example, the above-noted sodium-ion responsive glass is also pH-responsive, an electrode formed of a membrane of this glass would be unable to provide measurements simultaneously of a number of cationic species. A number of electrode each having a specific ion selectivity are therefore required, and this poses a most difficult problem where space is limited, as, for example, is found in measurement of ions in blood vessels.

Furthermore, the usual practice is to form the membrane in its bulbous form at one end of a tube of glass having a higher (preferably at least one or two orders of magnitude) bulk resistivity than the ion-sensitive glass. This creates a glass-to-glass junction which is often weak and unstable and is a cause of electrode failure.

A principal object of the present invention is to provide a novel glass electrode comprising as a unitary joint-free structure a glass membrane, at least a portion of which is ion-sensitive and has a relatively low bulk resistivity, supported on a higher bulk resistivity glass.

Another important object of the present invention is to provide a novel glass electrode comprising a unitary glass membrane, a portion of which has a composition preferentially responsive to a first ionic species and at least another portion of which has a composition preferentially responsive to another ionic species.

Yet other important objects of the present invention are to provide a novel glass electrode in which the glass thereof is of a substantially homogeneous alkali-silicate composition and which includes at least one ion-sensitive portion differing only in alkali-ion structure from the balance of said glass; to provide a method of making a glass electrode by forming a glass membrane relatively insensitive to a specific ion species and treating a predetermined portion of said membrane to exchange alkali metal ions and thereby render said portion sensitive to the presence of said specific ionic species; to provide such a method wherein said membrane has given bulk properties and wherein the treatment of said membrane alters surface properties of said portion without materially affecting said bulk properties; and to provide such a method wherein said membrane has given bulk electrical properties and wherein the treatment of the portion of the membrane alters the bulk electrical properties only of that portion.

Other objects of the present invention are to provide a unitary electrode including a membrane having a plurality of discrete, separate portions thereof selectively sensitive each to a different ion, and to provide such an electrode in which each of said portions have comparatively low bulk resistivities and are separated completely from one another by the balance of said membrane which has a comparatively high bulk resistivity, and including solid electrolyte means for separately coupling each of said portions to a respective electrical lead.

Yet other objects of the present invention will in part appear obvious and will appear hereinafter. The invention accordingly comprises the product and compositions possessing the features, properties and relation of components, and the processes involving the several steps and the relation and order of one or more of such steps with respect to each of the others, all as exemplified in the following detailed disclosure, and the scope of the application of which will be indicated in the claims. For a fuller understanding of the nature and objects of the present invention, reference should be had to the following detailed description taken in connection with the accompanying drawings wherein:

FIG. 1 is a schematic, sectional view of one embodiment of an apparatus for performing the method of the invention;

FIG. 2 is a cross-sectional view, partly in fragment, of one electrode embodying tht principles of the present invention;

FIG. 3 is a cross-sectional view, partly fragmentary, of another electrode embodying the principles of the present invention; and FIG. 4 is a cross-sectional view, partly in fragment, of yet another electrode embodying the principles of the present invention.

The method of the present invention broadly involves forming glass electrodes from a substantially homogenous glass of a first type containing ions of at least one alkali metal and which may or may not be ion-sensitive, and exchanging ions of the one alkali metal with ions of at least another alkali metal, thereby altering the composition of only the volume of glass wherein ion exchange has occurred. By this method, there is formed a glass electrode structure wherein at least one sharply delineated volume of the glass can be endowed with desired electrical properties. One embodiment of the method involves the steps of forming a membrane of an alkali silicate glass, contacting a predetermined area portion of a surface of the membrane with one alkali metal which is exchangeable with the alkali of the glass, bringing the membrane to a temperature at which the lattice softens, sufficiently to permit the silica lattice to accommodate the one alkali metal within a reasonable period of time, and rendering the metal molten while maintaining it in contact with the predetermined area for a predetermined period of time. Exchange can be controlled so as to alter the bulk properties of only a surface layer of the glass membrane. Alternatively, if it is desired, in a thin membrane, exchange can be continued until substantially the entire volume from surface to surface of the particular portion of the membrane has had its bulk properties modified.

The glass membrane can be formed of a number of known alkali-silicate glasses according to what properties are desired for the base or foundation glass of the electrode structure.

For example, it is known that an NAS 20–5 glass (20 mol percent $Na_2O$, 5% $Al_2O_3$, the remainder $SiO_2$) is of comparatively low bulk resistivity (ca. $1 \times 10^{10}$ ohms-cm.) and exhibits about a 1 to 1 ratio of sensitivities to $K^+$ and $Na^+$. A KAS glass (i.e. $K_2O$, $Al_2O_3$, and $SiO_2$) of comparable percentage composition is at least five times more sensitive to $K^+$ than $Na^+$, about 40 times as sensitive to $K^+$ as to $Li^+$, and also has a volume resistivity of approximately $1 \times 10^{12}$ ohms-cm., apparently because $K^+$ is not as highly mobile an ion as $Na^+$. Thus, the measurement of $K^+$ concentrations with membranes of KAS 20–5 glass requires considerably more sensitive electrometric amplifiers. In accordance with one variation of the method of the present invention, a membrane of 1.15 mm. thickness of NAS 20–5 glass is formed, heated to approximately 425° C. at which it is maintained while one surface thereof is contacted with molten potassium metal, for example, for 5 to 10 minutes. This results in a displacement of the $Na^+$ by $K^+$ in a surface layer of the glass. If substantially all of the $Na^+$ are thus displaced, the surface layer will exhibit preferential sensitivity to K ions in solution, typical of KAS 20–5 glass, but the resistance from surface to surface through the glass will be largely governed by the nature of the bulk glass, i.e., NAS 20–5.

The depth of the surface layer in which ion-exchange takes place, the thoroughness or the percentage extent of the exchange, and the speed of the exchange are governed largely by temperature and pressure considerations. The higher the temperature of the surface and the pressure of the metal against the surface, the quicker, deeper and more thoroughly the exchange will occur. For this reason and also for ease of handling, it is preferred that the alkali metal, such as the K in the example given, be amalgamated with Hg.

The method of the invention thus described can be carried out with apparatus such as is shown in FIG. 1 wherein the thickness of glass membrane, indicated as a fragment by reference numeral 20, is exaggerated for the sake of clarity in illustration. At one surface of membrane 20 there is disposed an alkali metal, preferably in the form of amalgam 22, which is enclosed within pressure container 24. Although the latter is shown as being metallic, other materials non-reactive with either mercury or alkali metal vapor can be used if desired. Container 24 is preferably evacuated or, alternatively, as shown, can hold an atmosphere 26, e.g., helium, which is non-reactive with the amalgam even at high temperatures. Heat applied to the container and membrane will first cause the mercury to evaporate raising the gas pressure inside the container. At the temperature at which the alkali metal alone becomes molten, the glass will have softened, i.e., the lattice rigidity is sufficiently reduced to permit enough alkali metal ion mobility to the extent that exchange can occur and the lattice has readjusted to accommodate the new ions within reasonable time periods such as described.

For example, starting with an NAS 11–18 glass which exhibits a preferential sensitivity of about 100/1 to $Na^+$ over $K^+$, after treatment as described at about 420° C. for 10 minutes with a K amalgam, the preferential sensitivity was changed by approximately a factor of 16 to about 7/1, $Na^+$ to $K^+$.

The simple exchange, for example of $K^+$ from the amalgam for $Na^+$ in the glass membrane, as thus described tends to form a glass volume in which exchange is not complete. Thus, in this example, KAS glass layer formed in the membrane will have some Na contaminant.

However, a preferred embodiment of apparatus for carrying out the method of the invention includes means for directing an electrical current of proper polarity through the softened glass transverse to the surface exposed to the amalgam. To this end, appropriate electrodes are provided. As shown, cathode 28 is in the form of a metal plate pressed against one side of membrane 20, and has lead 30 attached thereto and adapted to be coupled to a negative terminal of a current source such as a battery. As an anode, there can be provided a metallic plate similar to cathode 28, or the molten alkali metal itself can serve as an electrode. In the embodiment shown, however, container 24 and amalgam (in contact therewith) conveniently serve as the electrode; thus lead 32 is connected to container 24 and adapted to be coupled to the positive terminal of the current source.

Because of the polarity of the electrodes, and inasmuch as when the glass is heated its Na ions are highly mobile, under the influence of the potential across the membrane the $Na^+$ will migrate from the surface and toward the cathode. Indeed, if cathode 28 is a pool of mercury, an Na amalgam will be formed therefrom. As $Na^+$ is moved away from the one surface by the potential gradient, $K^+$ from the molten metal will be driven into that surface. It will be apparent that the use of a potential gradient to drive a current across the glass membrane not only accelerates the exchange process, but provides a much purer exchange layer or volume 34. Additionally, where the exchange without the current flow tends to produce a "doped" volume 34 with comparatively diffuse boundaries and a mixed alkali metal ion content, the use of the electrodes and current flow provides much sharper boundaries between the "doped" volume and the balance of the membrane, both transversely and laterally with respect to the surfaces of the membrane. This avoids problems arising out of the very high volume resistivities, typical of mixed alkali glasses, which characterize the diffuse type of boundaries.

A typical electrode formed according to the preceding method is shown in FIG. 2 wherein is included the usual cylindrical tubular body 40 formed of glass, for example the NAS 20–5 glass. One end of body 40 is closed as by membrane portion 42, initially formed of the same glass as an integral part of the body. However, in accordance with the ion exchange method of the present invention, membrane portion 42 has been treated to form a controlled volume 44 of glass, bounded by a small area of the outside surface of the membrane and extending therefrom, as shown by the broken line, only a limited distance into the volume of the membrane, volume 44 being substantially converted to a KAS 20–5 glass. Inside the electrode body is the usual electrically conducting lead, such as Ag-AgCl electrode 46 electrically connected through a known electrolyte solution 48 to the inner surface of the membrane adjacent volume 44. The method of the present invention can be used to form electrodes from a large number of cation-selective glasses, many of which are described in detail by G. Eisenman in Cation Selective Glass Electrodes and Their Mode of Operation, Biophysical Journal, Vol. 2, Part 2, Pages 259–323, 1962.

In another variation included within the present invention, one can begin with an electrode formed entirely of a high resistance glass and including a thin membrane portion, and provide in a specific part of the membrane a controlled ion-sensitive spot. For example, it is known that mixed alkali glasses, in which the mol percentage of each alkali oxide is approximately equal to the mol percentage of each other alkali oxide, are characterized by extremely high volume resistivities and are therefore well suited as a support glass for ion-sensitive electrodes. An electrode (including the membrane) formed as an integral unit of this one glass is then treated by the method hereinbefore set forth to render a specific volume of the membrane ion-sensitive. For instance, one starts with an electrode structure of NLAS 14–13–4 ($Na_2O$, 14 mol percent; $Li_2O$, 13 mol percent; $Al_2O_3$, 4 mol percent; the balance being $SiO_2$) glass which typically is not considered ion-sensitive and has a volume resistivity of about $1 \times 10^{14}$ ohms cm. When treated by the method of the invention (in which, of course, the membrane surface area being subjected to the exchange process is readily limited), using Na metal (as in the form of a heated amalgam, the pure molten metal, or even a molten salt) together with the softening of the glass, there will ultimately be provided in the membrane a volume of NAS 27–4 glass wherein the original $Li^+$ content has been substantially replaced with $Na^+$. Glass of this composition is known to be a potassium-ion sensitive glass with a resistivity a number of orders of magnitude less than the mixed alkali glass.

An example of an electrode formed in this manner is shown in FIG. 3 wherein high resistivity electrode body 50, a cylindrical tube formed of the mixed alkali oxide glass, is closed at one end with membrane 52. In the latter is controlled volume 54 of glass extending from surface to surface of the membrane and in which there is contained substantially only one species of alkali metal ion. The entire glass structure, as was the structure of FIG. 2, was initially formed as a unitary body. The electrode body contains therein the usual electrolyte solution 58 and electrically conductive lead wire 56, usually an Ag-AgCl electrode, in contact with the electrolyte.

In yet another variation of the present invention, a high resistivity, mixed alkali glass is formed by known procedures into a micro-tubule, and end of which is closed as by melting the tubule briefly at that point. The closed end can be treated by immersion or contact therewith, as in molten alkali metal or its salt, in order to form, as hereinbefore detailed, a single-alkali-glass tip. In this manner, excellent microelectrodes with tip diameters as small as 20 microns have been formed.

An important form of an electrode of the present invention which can be constructed according to the method described hereinbefore is shown in FIG. 4. This electrode, the glass portion of which is initially formed as a unitary structure, includes the usual tubular body 60 of a suitable glass, for example a mixed alkali high resistivity glass. The electrode includes membrane portion 62 in which a plurality of limited volumes 64 have been formed, each discrete and quite separate from one another. While the high resistivity of the unconverted or undoped balance of membrane portion 62 which separates each of volumes 64 acts to isolate them from one another electrically, a liquid electrolyte contacting the inner surface of the membrane adjacent all of volumes 64 would short circuit them to one another. Thus, in the preferred embodiment, electrode volumes 64 are each contacted by a correspondingly discrete and electrically independent solid electrolyte body 66. Each electrolyte body is formed of a normally (at room temperature and pressure) solid, electrically conductive, crystalline electrolyte in which an electrically conductive lead 68 is embedded. The electrolyte mass is bonded directly and intimately to both the surface of the membrane and to the lead and is believed to permit electronic charge transfer between the lead and electrolyte in both directions with negligible polarization potential and to permit ionic-charge transfer between the electrolyte and membrane glass. Suitable materials for the electrolyte mass are disclosed in application Ser. No. 320,866 filed Nov. 1, 1963. Particularly suited for this purpose are the silver halides, particularly AgCl, which can be applied in molten form and provides a tenaciously adherent material.

It will be appreciated that in the electrode structure of FIG. 4 the various volumes 34 can have either similar or different compositions, depending upon the nature of the treatment rendered in forming them. For example, membrane 62 can be formed of an NKAS 10–10–5 glass.

Such a glass characteristically exhibits high volume resistivity (ca. $1 \times 10^{14}$ ohms cm.) and is not considered to be ion-sensitive. The glass can be treated with an amalgam of Na at one position on the membrane and with a molten K at another position. Thus, according to the method of the present invention, there will be formed a membrane having at the one position a glass of approximately equal Na and K sensitivity, and at the other position a potassium glass, both well isolated electrically from one another, and signals from which are available at the respective lead wire embedded in the corresponding solid electrolyte mass contacting the surface of the particular sensitive glass.

Since certain changes may be made in the above compositions, products and methods without departing from the scope of the invention herein involved, it is intended that all matter contained in the above description or shown in the accompanying drawing shall be interpreted in an illustrative and not in a limiting sense.

What is claimed is:

1. In a method of producing glass electrodes for determining the activity of ions in solution, the improvement comprising the steps of:
    forming a membrane of an alkali aluminosilicate glass composition containing an oxide of a first alkali metal;
    contacting a predetermined portion of the outer surface of said membrane with a material containing a second alkali metal; and
    heating said membrane and said material to a temperature and for a sufficient time to permit ion exchange by the second alkali metal for the first alkali metal.

2. The method of claim 1, wherein said material is a molten alkali metal salt.

3. The method of claim 1, wherein said material is an alkali metal amalgam.

4. The method of claim 1, wherein said material is an alkali metal.

5. The method of claim 1, wherein said first alkali metal is sodium and said second alkali metal is potassium.

6. A glass electrode comprising a membrane of an alkali aluminosilicate glass containing at least an oxide of a first alkali metal and having a portion of its surface containing an oxide of a second alkali metal as an exchange for the oxide of said first alkali metal.

7. The electrode of claim 6, wherein said first alkali metal is sodium and said second alkali metal is potassium.

8. The electrode of claim 6, wherein said first alkali metal is lithium and said second alkali metal is sodium.

9. A glass electrode comprising, in combination, a glass tube and attached at one end thereof an integral glass membrane having a plurality of discrete, separate portions abutting at least one common surface of said membrane;
    the remainder of said membrane having a substantially homogeneous composition including a predetermined alkali metal content;
    the composition of each of said portions being different in alkali metal content than the composition of said remainder such that each of said portions is comparatively sensitive to a respective ionic species to which said remainder is comparatively insensitive;
    a plurality of electrically conductive leads;
    a plurality of solid, electrically conductive, crystalline electrolyte masses electrically isolated from one another, each mass being bounded intimately and directly to the inside surface of the membrane and to one of said leads.

(References on following page)

References Cited

UNITED STATES PATENTS

| | | | |
|---|---|---|---|
| 2,366,489 | 1/1945 | Cary | 204—195.1 |
| 3,129,160 | 4/1964 | Carter | 204—1.1 |
| 3,140,247 | 7/1964 | Fournie-Taillant-Vernioulet | 204—195.1 |

FOREIGN PATENTS 509,555  7/1939  Great Britain.

ROBERT K. MIHALEK, *Primary Examiner.*

T. TUNG, *Assistant Examiner.*